United States Patent [19]

Bryant-Jeffries et al.

[11] Patent Number: 4,553,320
[45] Date of Patent: Nov. 19, 1985

[54] ROTOR FOR A DYNAMO-ELECTRIC MACHINE AND METHOD OF MAKING SAME

[75] Inventors: Keith C. Bryant-Jeffries; Hugh G. Dickie; Eric V. Vaughan, all of Eastleigh, England

[73] Assignee: International Business Machines Corporation, Armonk, N.Y.

[21] Appl. No.: 546,349

[22] Filed: Oct. 28, 1983

[30] Foreign Application Priority Data

Dec. 30, 1982 [EP] European Pat. Off. ........ 82306986.9

[51] Int. Cl.⁴ ............................................. H02K 15/10
[52] U.S. Cl. ....................................... 29/598; 310/43; 310/266
[58] Field of Search ................. 29/598, 596, 458, 460; 310/43, 266; 264/272.19, 272.2

[56] References Cited

U.S. PATENT DOCUMENTS

| 3,084,418 | 4/1963 | Procorio | 264/272.2 |
| 3,426,223 | 2/1969 | Vaughan | 310/43 |
| 3,600,801 | 8/1971 | Larsen et al. | 310/43 |
| 4,107,587 | 9/1975 | Ban et al. | 310/202 |
| 4,398,167 | 9/1982 | Dickie et al. | 310/36 |

FOREIGN PATENT DOCUMENTS

| 31876 | 7/1980 | European Pat. Off. . |
| 55-166448(A) | 12/1980 | Japan . |
| 57-75542(A) | 12/1982 | Japan . |

Primary Examiner—Mark Rosenbaum
Assistant Examiner—P. W. Echols
Attorney, Agent, or Firm—Walter J. Madden, Jr.; Thomas R. Berthold

[57] ABSTRACT

A method of making a rotor, for a dynamo-electric machine, which has a number of arcuately formed rectangular loop coils arranged edgewise in a cylindrical configuration, employs injection moulding. Moulding material is injected between adjacent coils and penetrates between and around them to form an encapsulating framework. Entry of moulding material into the central apertures of the coils is prevented by inserts. By directing the moulding material inwardly, and spacing the coils slightly from the mould core, encapsulant also penetrates behind the coil faces to form a thin skin. By use of a shutter member, which may be an integral end cap, coil terminations can be led out of the mould cavity through apertures in the shutter to protect them from damage during the moulding process.

8 Claims, 6 Drawing Figures

ROTOR FOR A DYNAMO-ELECTRIC MACHINE AND METHOD OF MAKING SAME

TECHNICAL FIELD OF THE INVENTION

The present invention relates to rotors for dynamo-electric machines and to methods of making such rotors.

BACKGROUND ART

U.S. Pat. No. 4,398,167 (Dickie et al) entitled "Limited Angle Electric Rotary Actuator", relates to an electric rotary actuator for producing rotation through a limited angle. The rotor of this actuator is in the form of a cylindrical shell and includes several loop coils arranged in a cylindrical framework. The rotor lies in an annular flux gap defined by a stator magnet assembly and a flux return casing. Each pair of axially extending limbs of the adjacent loop coils lies opposite to and cooperates with a respective stator pole face.

The rotor for this actuator is made by pre-forming the coils and bonding them together at their edges with epoxy resin. The upper horizontal (non-active) limbs of this cylindrical coil structure are then bonded to the outer rim of a partial former. The former consists of an end cap, to which the coils are bonded, and a number of broad finger-like tabs, depending from the cap. These tabs locate exactly in the central apertures of the loop coils to provide additional support. However, they also increase the weight and moment of inertia of the rotor.

An alternative method of manufacture comprising injection moulding the former around the coil structure to encapsulate it is also briefly suggested. However, this has subsequently proved difficult to achieve in practice because of the somewhat complex shape of the partial former and also because of the difficulty of preventing damage to or disturbance of the termination wires of each coil under mould pressures and temperatures.

In U.S. Pat. No. 4,107,587 (Ban et al), entitled "Three phase DC motor having non-superimposed armature coils", there is shown one embodiment (FIGS. 9a and 9b) of such a motor having a rotor of somewhat similar structure to that of European application 31876-Al. Again several loop coils of rectangular plan but arcuate profile are arranged in a cylindrical manner as part of a cup-shaped armature or rotor.

However one difference between this rotor and that of U.S. Pat. No. 4,398,167 is that the coils are spaced slightly apart. A further major difference lies in the support structure for the coils, which are said to be "moulded with plastic into an armature". No details of the moulding process are given but the plastics material extends around the coil peripheries and also forms a disk shaped end cap for the armature. The plastics material also fills the central apertures of the loop coils thereby increasing the armature inertia. The electrical termination of the loop coils of U.S. Pat. No. 4,107,587 is inconvenient in that one end is at the periphery of the coil and the other is within the central aperture. It is not clear how these coil ends would be protected from disturbance and damage if pressure moulding were employed.

Reference is also made to Japanese published patent application 57-75542(A) for "Coil assembly of rotary machine and manufacture thereof". In this application a plurality of flat rectangular coils with rectangular holes at the center and arc sections are arranged cylindrically avoiding their overlapping each other. To arrange the coils cylindrically, an auxiliary member is provided with struts around a ring and the rectangular holes are engaged with convex projections on the struts. The auxiliary member and the coils are next arranged in a metal mold filled with resin to produce a unified coil assembly. No mention appears to be made of the termination of the coils and the protection of the termination during the moulding process.

Reference is also made to Japanese published patent application 55-166448(A) for "Stator for flat type brushless motor". This shows the manufacture of a discoidal rotor by moulding a number of coplanar flat coils into a disk of resin. A moulded terminal lead-out portion is provided on the bottom of each coil, the actual wires being picked out through lead-out holes in the bottom of the mould.

DISCLOSURE OF THE INVENTION

The prior art has therefore failed to provide a rotor of the cylindrical type which can be easily and reliably moulded in a manner which leaves convenient and undamaged coil terminations and which is of minimum inertia.

Accordingly the present invention provides a method of making a rotor for a dynamo-electric machine, the rotor being of the kind having a plurality of loop coils of rectangular plan and arcuate profile arranged edgewise in a cylindrical cup structure, the method comprising the steps of: winding the loop coils so that their terminations occur on the same side of the coil; bonding the turns of each coil together; positioning the coils in a mould defining a substantially annular cylindrical cavity, the mould having insert portions extending into and coextensive with the central apertures of the coils so that the coils are supported in a cylindrical configuration with gaps between their adjacent edges; feeding the coil terminations through apertures in a shutter which further defines the mould cavity, such that the terminations are outside the mould cavity; closing the mould to define the mould cavity completely, the closure also securing the coil terminations against movement during moulding; and introducing molten plastics material under pressure to the mould around one edge of the cylindrical coil configuration so that the plastics material penetrates between the coils and around their periphery to encapsulate them.

The invention also provides a rotor for a dynamo-electric machine made according to such a method.

Spacing the coils slightly apart facilitates penetration of the moulding material between and around the edges of the coils. This spacing is not deleterious to subsequent performance of the dynamo-electric machine and has been found to improve the linearity of response of a limited angle rotary actuator. The rotor so produced is of lower inertia than one in which the central apertures of the coils are filled.

Protecting the coil terminations by using a shutter to segregate them from the mould cavity prevents damage to them as a result of mould pressures. This is made possible by winding the coils so that the terminations occur on the same side of the coil so that they can be brought out through the shutter together.

For additional strength, without a great inertia penalty and for improved tolerance on one of the diameters of the rotor, the mould cavity slightly exceeds the coils in thickness and they are positioned against one of the cavity walls. The plastics moulding material is then introduced with a component of motion directed towards the other wall of the cavity so that it penetrates behind the coils. This forces them accurately against the first wall and leaves a thin skin of moulding material behind them. Preferably, this technique is used to form an inner skin which is thin in comparison to the thickness of the coils.

Preferably, the shutter is a discoidal end cap which is actually an integral part of the rotor. The apertures are slots in an outer rim of the cap. These slots are also filled by the plastics moulding material to key the end cap and encapsulated coil. structure together.

The end cap is advantageously pre-moulded from a thermosetting plastics material, preferably a phenolic resin, which is relatively strong in withstanding moulding pressures. In this case, the encapsulation plastics material is a thermoplastic, preferably a polybutylene terephthalate. For additional strength, both materials are glass filled.

The coils are, preferably, pre-coated with a plastics bonding material and are heat bonded together by passing an electric current through them. With the above combination of plastics, the bonding material is preferably a polyester and must be of higher melting point than the thermoplastic encapsulation material.

DETAILED DESCRIPTION

Before describing a preferred example of a method according to the invention, the rotor shown in FIGS. 1 and 2, which is a product of the method, will first be described.

Figure 3:
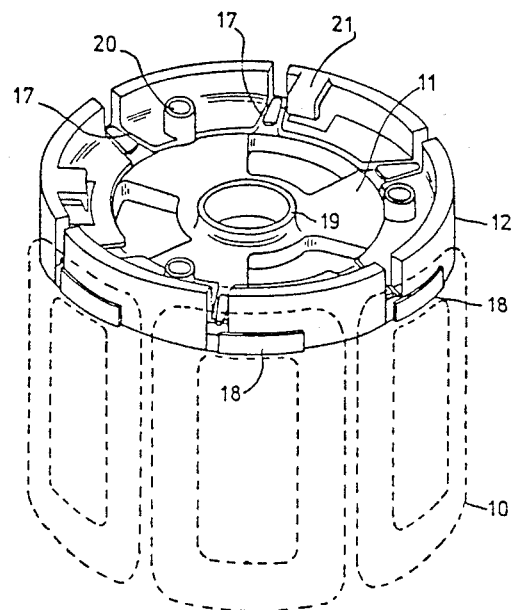
FIG. 3 shows an end cap forming part of the rotor of FIGS. 1 and 2, and the relative positions of the rotor coils with respect to the end cap.

The rotor comprises six loop coils 10 of rectangular plan but arcuate profile which are arranged edgewise in a cylindrical configuration about an end cap 11. The end cap, which is also shown in FIG. 3, is pre-moulded from a thermosetting phenolic resin and is discoidal in shape with an upturned outer rim 12. The coils 10 are encapsulated in a framework 13 of a polybutylene terephthalate thermoplastic material. This framework surrounds the periphery of each coil 10 but does not fill the central apertures of the coils. It also forms a thin skin 14 behind each of the limbs of the coils 10 to provide a slight increase in strength and, more importantly, a closely toleranced inner diameter. The skin 14 is about one tenth of the thickness of the coils themselves.

The thermoplastic material of framework 13 is also keyed to the end cap 11 by means of slots 15 in the outer rim 12. Passing through each of the slots 15, beneath the keying material, are the two termination wires 16 of a respective coil 10. These coils 10 are wound such that both these wires emerge on the same (inner) side of the coil and at the same point on its circumference to facilitate their passage through slots 15. Within the end cap the terminations are guided by fine channels 17 and are retained in these channels during moulding. Low ribs restrict the depth of the channels 17 near to the rim so that the wires 16 occupy all the available space and prevent penetration of the moulding material beyond slots 15.

Also visible in FIG. 3 are lands 18 on the outer rim 12. These space the coils 10 slightly from the rim to provide space for the wires 16 and also so that the thin skin 14 extends behind most of the upper limbs of the coils. The lands 18 also assist keying.

Figure 2:
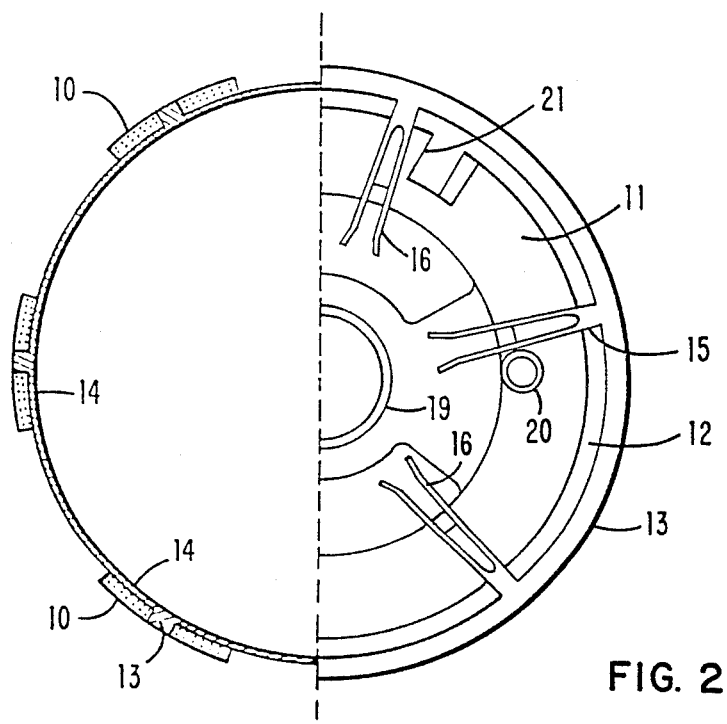
FIG. 2 is a plan view, partly sectioned, of the rotor of FIG. 1.

Other features of the end cap 11 which are visible in FIGS. 2 and 3, are not significant from a process point of view but relate to the function of the rotor as part of a limited angle rotary actuator. These include a central bush 19 for receiving the actuator spindle, which defines the axis of rotation. Three further bushes 20 enable the rotor to be connected directly to a load table formed as an integral extension of the spindle. Guides 21 serve to guide and retain a flexible cable to which the terminations 16 are electrically connected.

In all material respects, the actuator for which this rotor is designed, is identical to that described in the above referenced U.S. Pat. No. 4,398,167. For this reason the remainder of the actuator will not be described further.

Figure 1:
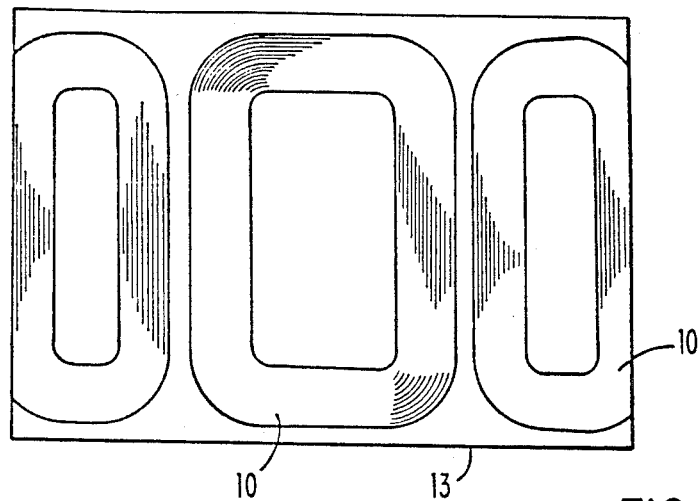
FIG. 1 is a side elevation of a rotor according to the present invention.

The method by which the rotor of FIGS. 1 and 2 is made will now be described with reference to FIGS. 3-6.

The first step is the manufacture of the individual coils 10 from aluminium wire insulated with a polyesterimide. The wire is further coated with an enamel containing a thermoplastic polyester dissolved in cresols. The wire is wound on a mandrel to the desired flat rectangular shape and so that both terminations occur on the same side of the flat coil and at the same point on the circumference. This point is near to one of the corners of the coil. If the wires do not terminate precisely where required they are brought round the periphery of the coil manually to the correct points.

After the flat coils have been wound, they are formed in a press into the desired arcuate configuration. After forming, the coils are heated to 200° C. by passage of an electric current to melt the thermoplastic outer coating and bond the turns together.

Figure 4:
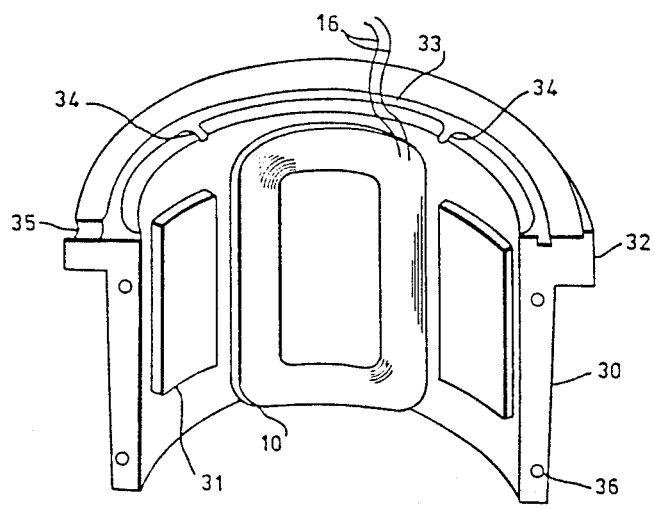
FIG. 4 shows an outer half-mould, having one rotor coil positioned therein, for use in a method according to the present invention, for making the rotor of FIGS. 1 and 2.
Figure 5:
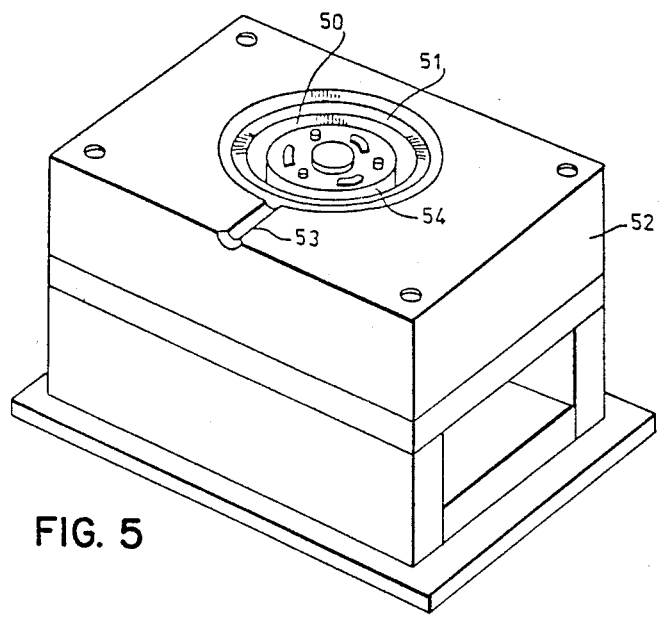
FIG. 5 shown a lower mould assembly and inner core, defining a cavity for receiving the half-mould of FIG. 4.
Figure 6:
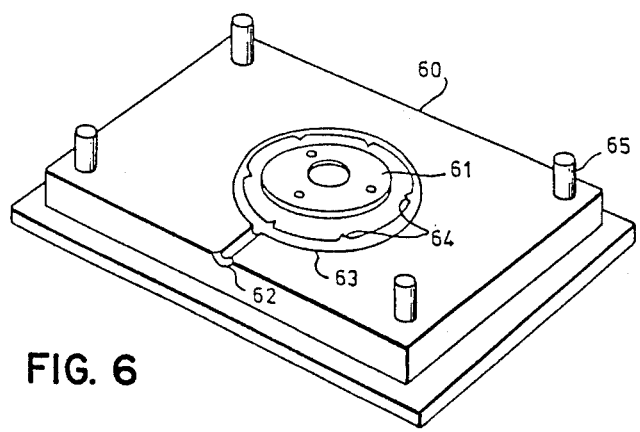
FIG. 6 shows a mould top for closing the mould assembly of FIG. 5.

Six of the coils 10 are then positioned in the mould illustrated in FIGS. 4-6. In FIG. 4, a cylindrical outer half-mould 30 is shown with one of the coils 10 in place. The coils are located, as shown, on inserts 31 which are coextensive with the central apertures of the coils and are slightly thicker than the coils in a radial direction. The inserts support the coils and prevent entry of moulding material into their central apertures. The coil terminations 16 emerge from the inner faces of the coils 10 at their upper left hand corners, as seen in FIG. 4.

The half-mould also includes an outer flange 32, the upper surface of which is formed with portions of a runner 33 and several gates 34 which are fed with moulding material via a sprue, part of which is visible at 35. The gates 34 are positioned at gaps between adjacent coils 10. The half-mould also includes sockets 36 for receiving pins of an otherwise identical half-mould (not shown).

When six of the coils 10 have been positioned in both half-moulds, the half-moulds are assembled together into a full cylindrical outer mould and placed within a substantially annular cavity 50 in the lower mould assembly of FIG. 5 which is built up from a stack of mould plates. The cavity 50 is slightly tapered on its outer wall and is so dimensioned as to hold the two halves of the cylindrical mould, which have a complementary outer taper, together. The flanges 32 of the cylindrical mould rest on a shoulder 51 recessed within the top plate 52. The part sprues 35 of the cylindrical mould are aligned with a main sprue 53 formed in the top plate 52.

Also visible in FIG. 5, is a cylindrical mould core 54 whose outer surface determines the eventual inner diameter of the rotor. The upper surface of the mould core 54 receives the pre-moulded end cap 11 which is located by means of inserts complementary in shape to the apertures in the end cap, such as bushes 19 and 20.

After the end cap 11 has been placed on core 54, the position of the coils 10 in relation to the cap is as shown in FIG. 3. It will be recalled, that lands 18 act to stand off the coils from the outer rim of the cap and also from the inner core by an amount equal to the thickness of the eventual inner skin 14. The terminating wires 16 of all six coils are then fed through slots 15 in the cap and bent over to lie in channel 17.

The final step in the assembly of the mould is its closure with the mould top 60 shown inverted in FIG. 6. The top 60 includes a short cylindrical closure insert 61 which fits snugly within the outer rim 12 of end cap 11. Also formed in the mould top are the upper halves 62, 63 and 64 of the sprue, runner and gates, respectively. The top is located in the lower mould assembly of FIG. 5 by means of pins 65.

The clamped mould assembly is placed in the press of an injection moulding machine whose injection nozzle is aligned with the sprue of the mould assembly of FIG. 4–6 when closed. A precise charge of moulding material, which is a glass filled polybutylene terephthalate is introduced into the machine and heated to 240°–250° C. to render it molten. After the mould assembly has been pre-heated to 70°–80° C., as determined by sensors (not shown), the charge of molten moulding material is injected into the mould assembly at a pressure of 14500 p.s.i. to encapsulate the coil.

The material penetrates between the vertical limbs of coils 10 and around their upper and lower edges to form frame 13. Because it has an inward component of motion and because of the spacing effect of lands 18, it also penetrates behind the coil limbs and spreads outwardly to form the inner skin 14. The pressure of the material acts to force the coils 10 outwardly against the walls of outer cylindrical mould 30. This and the inserts 31 results in the coils being precisely located at the outside face of the finished rotor.

The moulding material keys the frame 13 to the end cap 11 by entering slots 15 and surrounding lands 18. The end cap itself acts as a shutter to protect the coil terminations 16 during the moulding operation. Because the terminations are clamped outside the mould cavity in channels 17 by the closure insert 61 they are not disturbed or damaged by the process.

We claim:

1. A method of making a rotor for a dynamo-electric machine, the rotor being of the kind having a plurality of loop coils of rectangular plan and arcuate profile arranged edgewise in a cylindrical cup structure, the method comprising the steps of:
    winding the loop coils so that their terminations occur on the same side of the coil;
    bonding the turns of each coil together;
    providing a mould having an outer cylindrical portion, an inner cylindrical core, a bottom and a removable top;
    positioning the coils within and against the inner wall of the outer cylindrical mould portion, the outer cylindrical mould portion having insert portions extending into and coextensive with the central apertures of the coils so that the coils are supported in a cylindrical configuration with gaps between their adjacent edges;
    feeding the coil terminations through slots in the outer rim of a discoidal end cap whose outer diameter is generally the same as the inner diameter of the cylindrical coil configuration such that the terminations are outside the end cap;
    placing the end cap over the mould outer cylindrical portion and inner core and the cylindrical coil configuration;
    placing the mould top over the end cap to close the mould and thereby define the mould cavity completely, the closing of the mould with the top also securing the coil terminations against movement during moulding; and
    introducing molten plastics material under pressure into the mould cavity around one edge of the cylindrical coil configuration so that the plastics material penetrates between the coils and around their periphery to encapsulate them and into the slots in the end cap to key the end cap and coils together, thereby forming the rotor with the end cap as an integral part thereof.

2. A method as claimed in claim 1 in which the step of introducing molten plastics material includes the step of introducing said material with a component of motion directed towards the inner core of the mould so that it penetrates behind the coils and forces them against the inner wall of the outer cylindrical mould portion, thereby forming a thin skin behind the coils.

3. A method as claimed in claim 1 comprising the step of pre-moulding the end cap from a thermosetting plastics material, the plastics material for encapsulating the coils being thermoplastic.

4. A method as claimed in claim 3 in which the thermosetting plastics material is a phenolic resin and the thermoplastic plastics material is a polybutylene terephthalate.

5. A method as claimed in claim 4 in which both plastics materials are glass filled.

6. A method as claimed in claim 1 in which the turns of the coils are precoated with a plastics bonding material and are heat bonded together by passing an electric current through the coils.

7. A method as claimed in claim 6 in which the turns of the coils are made of aluminium and the bonding material is a polyester of higher melting point than the encapsulation material for the coils.

8. A method as claimed in claim 1 in which the loop coils are wound in a flat rectangular shape, and are subsequently formed into an arcuate profile prior to bonding of the turns.

* * * * *